Sept. 25, 1956
A. WEIGEL
2,763,975
HYDRAULIC STONE PICKER
Filed Sept. 23, 1953
3 Sheets-Sheet 1
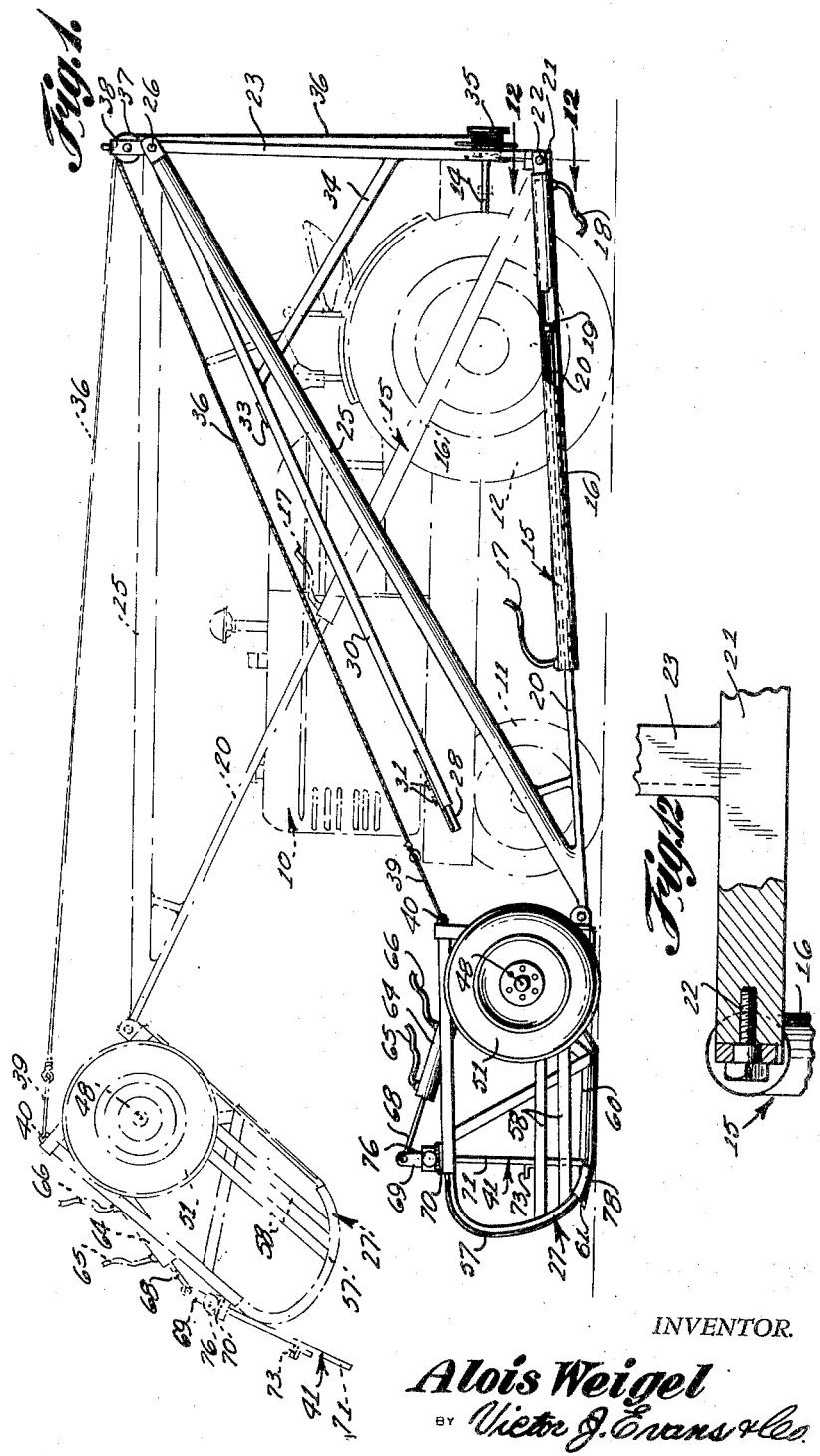
INVENTOR.
*Alois Weigel*
BY *Victor J. Evans & Co.*
ATTORNEYS

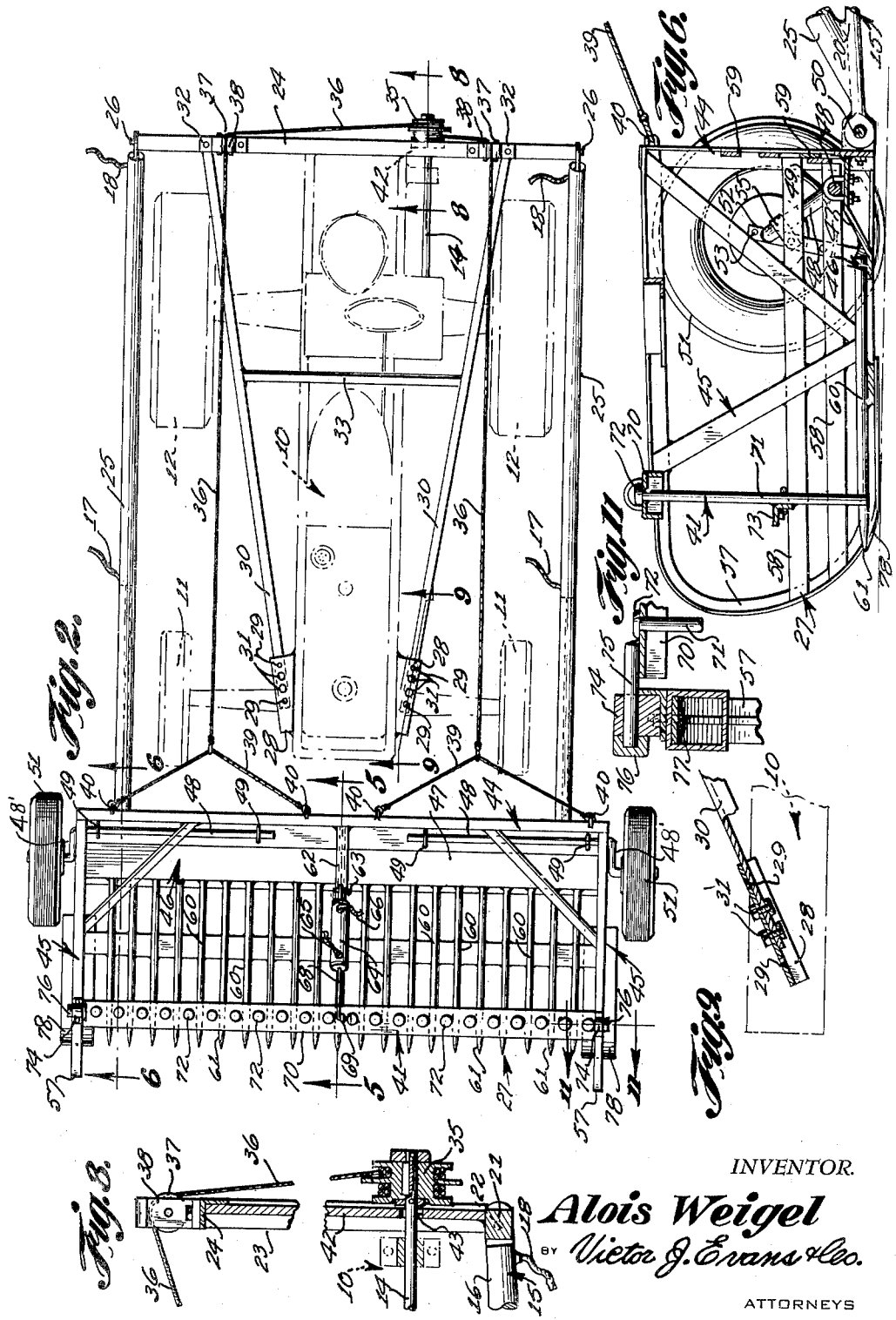

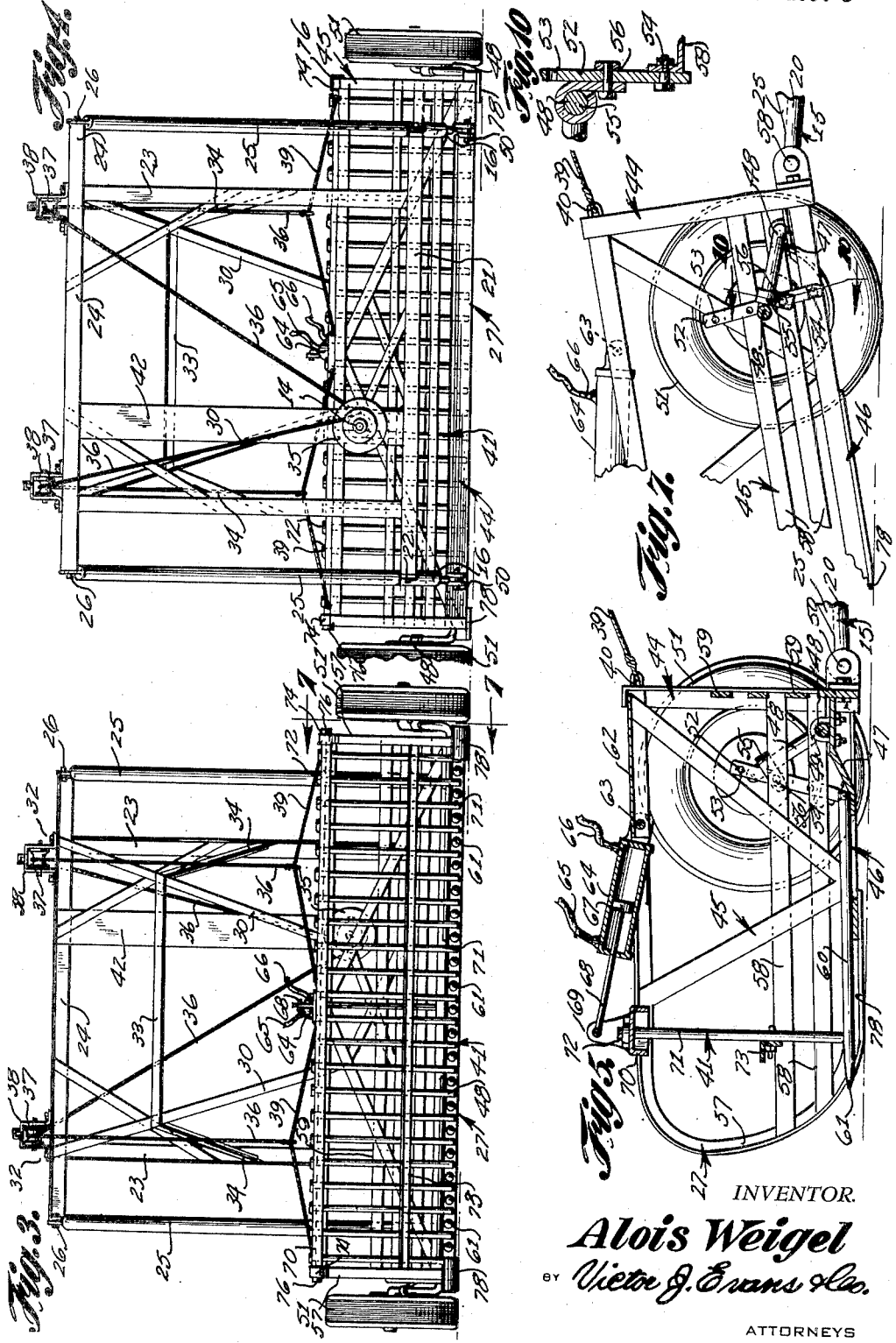

United States Patent Office 2,763,975
Patented Sept. 25, 1956

2,763,975
HYDRAULIC STONE PICKER
Alois Weigel, Burnstad, N. Dak.
Application September 23, 1953, Serial No. 381,849
1 Claim. (Cl. 55—17)

This invention relates to a rock or stone picker, and more particularly to a hydraulic stone picker for attachment to a tractor.

The object of the invention is to provide a stone or rock picker which can be readily attached to or detached from a tractor whereby fields or other areas can be quickly and easily cleaned of rocks, stones and the like, there being a means provided for dumping the stones into a suitable receptacle when desired.

Another object of the invention is to provide a stone picker which can be attached to any type of tractor that is provided with hydraulic operating means whereby loose stones can be picked from fields as the tractor runs along the ground and wherein any size stones or rocks can be picked up and dumped into a truck or receptacle.

A further object of the invention is to provide a hydraulic stone picker which includes means for loading the stones into a rake or scoop together with means for raising the rake and dumping the stones from the raised position of the rake.

A further object of the invention is to provide a hydraulic stone picker which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the hydraulic stone picker, constructed according to the present invention, and showing the tractor to which it is attached in broken lines.

Figure 2 is a top plan view of the hydraulic stone picker.

Figure 3 is a front elevational view of the hydraulic stone picker.

Figure 4 is a rear elevational view of the hydraulic stone picker.

Figure 5 is an enlarged sectional view taken on the line 5—5 of Figure 2.

Figure 6 is an enlarged sectional view taken on the line 6—6 of Figure 2.

Figure 7 is an enlarged fragmentary side elevational view of the rake and showing the bucket or rake in adjusted position.

Figure 8 is an enlarged sectional view taken on the line 8—8 of Figure 2.

Figure 9 is an enlarged sectional view taken on the line 9—9 of Figure 2.

Figure 10 is an enlarged sectional view taken on the line 10—10 of Figure 7.

Figure 11 is an enlarged sectional view taken on the line 11—11 of Figure 2.

Figure 12 is an enlarged sectional view taken on the line 12—12 of Figure 1.

Referring in detail to the drawings, the numeral 10 designates a conventional tractor, broken lines, and the tractor 10 may include front wheels 11 and rear wheels 12. A power take-off shaft 14 extends rearwardly from the tractor 10.

The present invention is directed to a stone or rock picker which is adapted to be detachably connected to the tractor 10 whereby as the tractor 10 moves along a field rocks can be readily picked up and dumped into any suitable receptacle or truck or other body. The rock picker includes a frame which comprises a pair of side beams 15 which are arranged on opposite sides of the tractor 10. Each of the side beams 15 includes a hollow sleeve or cylinder 16 which has its ends adapted to be connected to a suitable conventional source of hydraulic fluid on the tractor 10 by means of conduits or lines 17 and 18. A plunger 19 is slidably or reciprocably mounted in the sleeve 16, and a rod 20 is secured to the plunger or piston 19 and extends forwardly from the sleeve 16.

A horizontally disposed bar 21 extends between the rear ends of the pair of beams 15 and is pivotally connected thereto by pins 22, Figure 1. Extending upwardly from the bar 21 and secured thereto is a pair of spaced parallel vertically disposed posts 23, Figure 4, and a horizontally disposed crosspiece 24 is secured to the upper ends of the posts 23 in any suitable manner, as for example by welding. A pair of inclined arms 25 each have their upper rear ends pivotally connected to the ends of the crosspiece 24 by pins 26, and the lower front ends of the arms 25 are secured to the front ends of the rods 20, Figure 1. Thus, as hydraulic fluid under pressure is supplied to the sleeves 16 through the lines 18 the pistons 19 will move from right to left, Figure 1, whereby the rake 27 will be raised or moved from the position shown in solid lines to the position shown in broken lines in Figure 1.

Secured to the tractor 10 adjacent the front end is a pair of L-shaped bracket 28, Figure 9, and each of the brackets 28 is provided with a plurality of openings 29. A pair of angularly arranged braces 30 are adjustably connected to the brackets 28 by bolt and nut assemblies 31, and the rear ends of the braces 30 are secured to the crosspiece 24 by suitable bolt and nut assemblies 32. A tie bar 33 interconnects the braces 30 together, Figure 2, so as to maintain these parts in their proper spaced apart relation. Suitable support members 34 are also secured to the braces 30 for insuring that the parts are maintained in their proper positions, Figure 1.

A means is provided for dumping the rake 27 when the rake 27 is in its raised position as shown by broken lines in Figure 1. This means comprises a sheave 35 which is keyed to or otherwise secured to the power take-off shaft 14 leading from the tractor. Cables 36 are arranged in engagement with the sheave 35, and the cables 36 are trained over a pair of spaced apart pulleys 37. Each of the pulleys 37 is journaled in a bracket 38 which is secured to the crosspiece 24, Figures 3, 4 and 8. The cables 36 are connected to lines 39, and the lines 39 are arranged in engagement with eyelets 40 which are secured to the upper rear portion of the pivotally mounted rake 27. Thus, with the rake 27 in its raised position, by slackening or loosening the lines 36, the rake will be permitted to tilt in a counterclockwise direction so that with the rake loaded with stones, the stones will be permitted to drop into a truck or receptacle, provided the gate 41 is swung open as later described in this application. A vertically disposed body member 42 extends between the cross piece 24 and bar 21, Figures 4 and 8, and the body member 42 is provided with an opening 43 for the projection therethrough of the power take-off shaft 14.

The hingedly mounted rake 27 includes a pair of spaced parallel vertically disposed side sections 45, a back section 44, and a bottom section 46, and these sections may be secured together and may be made of any suitable material such as angle iron or other suitable shaped rigid material. The front end of the rake 27 is open so that when the gate 41 is pivoted out of the way rocks will be able to enter the rake 27 and then the gate 41 can be pivoted in a counterclockwise direction to help force the stones or rocks into the rake.

The bottom section 46 of the rake 27 includes an elongated plate 47 which extends between the side sections 45 and is secured thereto, the plate 47 having an offset portion and being arranged in the rear lower portion of the rake. A pair of axles 48 are connected to the plate 47 by suitable U-bolt assemblies 49, Figure 5. The axles 48 may have offset portions 48'. A ground engaging wheel 51 is connected to the outer end of each of the axles 48. The rake 27 is pivotally connected to the front end of each of the rods 20 by a suitable pivot pin assembly 50. An adjustable link 52 is pivotally connected to the outer surface of each of the side sections 45 by a bolt and nut assembly 54, Figure 7, and each of the pair of links 52 is provided with a plurality of apertures 53. A clamp 55 is arranged in engagement with each of the axles 48, and a suitable bolt and nut assembly 56 extends through the clamp 55 and into engagement with one of the apertures 53. Thus, by changing the aperture 53 through which extends the bolt and nut assembly 56, the elevation of the rake 27 with respect to the ground can be adjusted as desired. Thus, in Figure 5 the rake 27 is shown in a lowered position while in Figure 7 the rake 27 is shown in a different or raised angular position with respect to the ground and these adjustments can be readily and easily accomplished simply by loosening the bolt and nut assembly 56 and moving the parts as desired.

Each of the side sections 45 of the rake 27 includes a frame piece 57 and a plurality of spaced parallel strips 58. The back section 44 includes a pair of spaced parallel strips 59, and the strips 58 and 59 cooperate to prevent the rocks or stones from accidentally falling from the rake enclosure. Secured to the bottom section 46 of the rake is a plurality of spaced parallel teeth 60 which serve to support the rocks or stones, and the front ends of each of the teeth 60 is pointed as at 61 to facilitate the picking up or digging up of the rocks or stones from the ground being cleared.

Extending forwardly from the upper portion of the back section 44 intermediate its ends, is a link 62, and a pin 63 pivotally connects a hydraulic cylinder 64 to the link 62. Hydraulic lines 65 and 66 are adapted to be used for connecting the ends of the cylinder 64 to a suitable source of hydraulic fluid under pressure, and a plunger or piston 67 is slidably mounted in the cylinder 64. A rod 68 is secured to the piston 67, and the front end of the rod 68 is pivotally connected to an ear 69, Figure 5. The ear 69 is secured to a tie bar 70 and the tie bar 70 extends between the side sections 45 and is secured thereto. Depending from the tie bar 70 is a plurality of spaced parallel vertically disposed fingers 71 which each have a suitable head 72 on their upper end for maintaining the fingers 71 secured to the tie bar 70. The fingers 71 constitute a gate 41 which can be swung to help force the rocks into the open end of the rake 27, and also the gate 41 can be positioned as shown in Figures 1 and 5 in solid lines to maintain or retain the stones within the rake 27. However, the gate 41 can be pivoted to the position shown in broken lines in Figure 1 when the rake 27 is in raised position whereby the stones will be able to fall out of the rake by gravity. A suitable brace bar 73 extends across the front of the fingers 71 to maintain the fingers in their proper spaced apart relation.

A means is provided for pivotally connecting the gate 41 to the rake 27, and this means comprises a pair of pivot pins 75, Figure 11. The pins 75 may be secured to opposite ends of the tie bar 70, and the pins 75 extend rotatably through bearing blocks 74 which may be secured to the frame pieces 57 by bolt and nut assemblies 77. A suitable cap 76 may be provided on the outer end of each of the pins 75 for maintaining the parts in their proper assembled relation. A suitable ground engaging shoe 78 may be secured below each of the side sections 45 adjacent the front end thereof, and the shoes 78 may be shaped arcuately for facilitating the movement of the rake along the ground as the tractor is operated.

From the foregoing it is apparent that a rock or stone picker has been provided which can be used with a conventional tractor such as the tractor 10. In use the rock picker is connected to the tractor 10 by means of the brackets 28 and arms 30 and then as the tractor 10 is driven along a field containing stones to be removed, the stones can be readily picked up and carried to a suitable location. To pick up the stones a hydraulic fluid from a suitable mechanism on the tractor 10 is supplied to the cylinder 64 through the line 65 whereby the gate 41 will be swung and the tractor can be driven along the field with the gate 41 in raised position. With the gate 41 in raised position, the pointed ends 61 of the teeth 60 will guide the stones from the ground into the interior of the rake 27. These stones will be retained in the rake 27 since only the front end is open, the back and sides being closed. If desired the cylinder 64 can be supplied with hydraulic fluid through the line 66 to cause the gate 41 to pivot about an axis extending through the pins 75 whereby the gate can be used to shove or push the stones which may be on the front portion of the teeth 60 rearwardly into the rake. After the rake 27 has been filled with the desired quantity of stones or rocks, hydraulic fluid can be passed into the interior of the pair of cylinders or sleeves 16 through the lines 18 whereby the beam 15 and arms 25 will move from the solid line position shown in Figure 1 to the broken line position of Figure 1. Then, tension on the lines 36 can be slackened or released by means of the power take-off shaft 14 so that the entire rake 27 will pivot from a horizontal to an inclined position as shown in broken lines in Figure 1, the rake 27 pivoting about an axis extending through the pins 50. At the same time the cylinder 64 can be actuated to permit the gate 41 to move open so that the stones or rocks in the rake can fall into a truck to be hauled away or into any suitable receptacle. After the rake 27 has been emptied, hydraulic fluid can be passed into the line 17 to return the parts to the position shown in solid lines in Figure 1 and tension can be increased on the lines 36 whereby the device is again ready for continued use.

The stone picker can be attached to any tractor that has hydraulic mechanism thereon and the device can be used to pick up loose stones from cultivated fields. In use the tractor is run along the ground with the device in lowered position and as the rock picker is moved along the ground the stones or rocks will roll up onto the protruding teeth 60 and the sweep or gate 41 which is operated by the hydraulic pump 64 can be used to roll the stones back into the rake. When the load is full the device can be raised and the tractor can be driven to a rock pile or other locality whereby the load can be dumped and hauled away.

I claim:

In a hydraulic stone and rock picker, a frame, a rake pivotally connected to the front of said frame, said rake comprising a back section including a plurality of spaced parallel horizontally disposed strips, cable means connected to said back section for effecting pivotal movement of said rake, a pair of spaced parallel vertically disposed side sections secured to said back section, a bottom section extending between the lower portion of said side sections and secured thereto, said bottom section including an elongated plate, a pair of adjustable axles having portions connected to said plate, ground engaging wheels connected to the outer ends of said axles, clamping means connected to said axles for permitting the elevation of the rake with respect to the ground to be adjusted, a gate hingedly mounted between said side sections and including a plurality of spaced parallel vertically disposed fingers, the front of said rake being open and said gate being mounted for movement into and out of clamping relation with respect to the open front end of the rake, hydraulic means for moving said gate, the bottom section of said rake further including a plurality of teeth each having their front ends pointed, and an arcuately shaped ground engaging shoe secured below each of said side sections.

References Cited in the file of this patent
UNITED STATES PATENTS

| | | |
|---|---|---|
| 2,295,917 | Schwan | Sept. 15, 1942 |
| 2,624,959 | Anderson | Jan. 13, 1953 |